US012272844B1

(12) United States Patent
Cahayla et al.

(10) Patent No.: US 12,272,844 B1
(45) Date of Patent: Apr. 8, 2025

(54) PRESSURE ACTIVATED BATTERY SYSTEM (71) Applicant: U.S. Gov. as Rep'd by the Secretary of the Army, Picatinny Arsenal, NJ (US)

(72) Inventors: Jason Cahayla, Kinnelon, NJ (US); Barry Schwartz, Newton, NJ (US)

(73) Assignee: The United States of America as Represented by the Secretary of the Army, Washington, DC (US)

( * ) Notice: Subject to any disclaimer, the term of this patent is extended or adjusted under 35 U.S.C. 154(b) by 93 days.

(21) Appl. No.: 18/315,218

(22) Filed: May 10, 2023

(51) Int. Cl.
*H01M 6/38* (2006.01)
*F42C 15/33* (2006.01)
*H01M 50/682* (2021.01)

(52) U.S. Cl.
CPC ............... *H01M 6/38* (2013.01); *F42C 15/33* (2013.01); *H01M 50/682* (2021.01); *H01M 2220/30* (2013.01)

(58) Field of Classification Search
CPC .. H01M 2220/30; H01M 50/682; H01M 6/38; F42C 15/33
USPC ......................................................... 102/224
See application file for complete search history.

(56) References Cited

U.S. PATENT DOCUMENTS

| | | | |
|---|---|---|---|
| 3,585,933 A | 6/1971 | Kos | |
| 3,601,057 A | 8/1971 | Kline | |
| 3,630,150 A | 12/1971 | Rakowsky | |
| 3,653,972 A * | 4/1972 | Bolles | H01M 6/38 429/116 |
| 3,672,300 A | 6/1972 | Axelson | |
| 3,754,996 A * | 8/1973 | Snyder | H01M 6/38 429/114 |
| 3,894,490 A | 7/1975 | Zacharin | |
| 3,945,845 A * | 3/1976 | Morganstein | H01M 6/38 429/114 |
| 4,188,886 A | 2/1980 | Brauer | |
| 4,339,638 A | 7/1982 | Lascelles | |
| 4,592,281 A | 6/1986 | Nagennast | |
| 4,614,156 A | 9/1986 | Colle | |
| 4,643,096 A | 2/1987 | Durrell | |
| 4,653,402 A | 3/1987 | Halssig | |
| 4,660,473 A | 4/1987 | Bender | |
| 4,675,480 A | 6/1987 | Jones | |
| 4,716,808 A | 1/1988 | Hoch | |
| 4,861,686 A * | 8/1989 | Snyder | H01M 6/38 429/115 |
| 4,899,659 A | 2/1990 | Hardt | |
| 4,953,475 A | 9/1990 | Munach | |
| 5,040,463 A | 8/1991 | Beaverson | |
| 5,243,917 A | 9/1993 | Komstadius | |
| 5,262,753 A | 11/1993 | Duplaix | |
| 5,271,327 A * | 12/1993 | Filo | F42C 13/08 102/202.5 |

(Continued)

*Primary Examiner* — John Cooper
(74) *Attorney, Agent, or Firm* — John P. DiScala (57) ABSTRACT

A battery activation device uses ballistic pressure to directly activate a liquid reserve battery and simultaneously complete the battery ground circuit to the electronics system. The gas pressure generated during ballistic launch reacts upon a piston face that transforms the pressure directly into a linear force which is then applied to the liquid reserve battery for activation. An internal shear disc prevents unintentional battery activation from an accidental drop and if sufficient launch pressure has not been realized by device.

15 Claims, 9 Drawing Sheets

(56) References Cited

U.S. PATENT DOCUMENTS

| | | | |
|---|---|---|---|
| 5,341,343 A | 8/1994 | Aske | |
| 5,524,333 A | 6/1996 | Hogue | |
| 5,693,906 A | 12/1997 | Van Sloun | |
| 7,150,228 B2 | 12/2006 | Scherge | |
| 7,258,068 B2 | 8/2007 | Worthington | |
| 8,007,934 B2 * | 8/2011 | Glatthaar | H01M 6/38 |
| | | | 429/114 |
| 8,333,151 B2 | 12/2012 | Krisher | |
| 8,635,872 B2 | 1/2014 | Mayer | |
| 9,291,040 B1 | 3/2016 | Hardesty | |
| 9,470,498 B1 | 10/2016 | Cahayla | |
| 2015/0017488 A1 * | 1/2015 | Dyer | H01M 6/38 |
| | | | 429/52 |

* cited by examiner

PRESSURE ACTIVATED BATTERY SYSTEM

STATEMENT OF GOVERNMENT INTEREST

The inventions described herein may be manufactured, used, and licensed by or for the United States Government.

FIELD OF THE INVENTION

The invention relates in general to batteries and in particular to activation mechanisms for batteries.

BACKGROUND OF THE INVENTION

Liquid reserve batteries are utilized in a variety of applications due to their long storage life. These batteries do not produce any voltage to the system unless it is acted upon by a specific external stimulus to activate the battery. Once the battery is subject to this stimulus, a non-reversible change takes place within the battery. This design allows the battery to remain completely dormant for an extended period of time without any degradation in performance because the internal elements that produce the voltage remain separated and preserved.

The internal components of a liquid reserve battery system are similar to a traditional battery and include an anode, cathode, and an electrolyte that completes the circuit and provides the chemical reaction necessary to generate a voltage. They differ from traditional batteries in that liquid reserve batteries keep the electrolyte separate from the anode and cathode thus remaining dormant. The electrolyte is typically contained in a frangible containment device called an ampoule. The electrolyte ampoule can be made of glass, metal, or any other suitable material for containing the electrolyte. The ampoule provides a barrier which completely isolates the electrolyte from the anode and cathode. The ampoule is made to rupture or shatter when intended and readily allow the electrolyte liquid to flow freely into the battery to wet the battery and thereby generate voltage.

There are various battery activation methods that are currently available that rely on acceleration of the battery to rupture the electrolyte ampoule. In battery units where a glass ampoule contains the electrolyte, the ampoule can be shattered during an acceleration event. The ampoule makes physical contact with an internal mechanical stress riser that induces ampoule breakage and allows the dispersion of electrolyte. Another method of containing the electrolyte liquid uses a metal housing. Under an acceleration event, a separate piercing disc makes contact with the metal ampoule and pierces thru the ampoule at multiple points to release the electrolyte which will in turn, wet the battery. A third method uses an external mechanism or "hammer" that reacts during an acceleration event to apply an external impact force to shatter the glass ampoule and release the electrolyte liquid.

There are downsides to the above approaches. For ballistic payloads, such as munitions, the above methods of activation utilize the acceleration force that is generated during a ballistic launch as the source of actuation energy. However, the force required to break the ampule must be balanced against the need to keep the ampule from breaking during unintended impact events such as drops.

In addition, if the acceleration is of a high magnitude, there is usually not a problem with sufficient force being provided for activation. However, if the launch experiences a lower acceleration magnitude, the ability to reliably activate the battery cell can become problematic.

Further, in smaller battery units which are becoming more prevalent due to smaller electronic systems, the smaller battery system inherently does not have the same mass to react under. Another downside is that the glass ampoule containing the electrolyte must be made to very tight requirements to ensure that the activation occurs at the correct acceleration level. Finally, another downside is that these battery systems must solely rely on acceleration events to activate.

A need exists for a reliable apparatus and method for activating a liquid reserve battery.

SUMMARY OF INVENTION

One aspect of the invention is a pressure activated battery system for a projectile wherein ballistic pressure for launching the projectile transitions the pressure activated battery system from an inactive state to an active state by translating a piston to releasing an electrolyte in a liquid reserve battery subassembly.

A launch-launched projectile comprising a pressure activated battery system in a base of the projectile. The pressure activated battery system further comprises a housing, a piston, and a liquid reserve battery subassembly. The housing defines a front cavity and a rear cavity connected by a central hole. The rear cavity comprises a slip fit region exposed to an external environment and a press fit region forward of the slip fit region. The piston is contained within the rear cavity and in the inactive state is restrained within the slip fit region by a shear disc positioned between the slip fit region and the press fit region. The liquid reserve battery subassembly is housed within the front cavity. The liquid reserve battery subassembly further comprises a battery housing and an electrolyte-filled glass ampoule contained within the housing. In response to ballistic pressure, the piston translates forward in the rear cavity thereby rupturing the shear disc and breaking the electrolyte-filled glass ampoule to transition the pressure activated battery system from an inactive state to an activated state by simultaneously releasing an electrolyte in the liquid reserve battery subassembly and completing a battery ground circuit of said liquid reserve battery subassembly.

The invention will be better understood, and further objects, features and advantages of the invention will become more apparent from the following description, taken in conjunction with the accompanying drawings.

BRIEF DESCRIPTION OF THE DRAWINGS

In the drawings, which are not necessarily to scale, like or corresponding parts are denoted by like or corresponding reference numerals.

DETAILED DESCRIPTION

The pressure activated battery assembly does not rely on launch acceleration for battery activation but rather uses the pressure generated by the burning of the propellant to mechanically rupture an electrolyte containment device and activate the liquid reserve battery. The gas pressure generated during ballistic launch reacts upon a piston face that transforms the pressure directly into a linear force which is then applied to the liquid reserve battery for activation. The end of the piston that contacts the battery cell induces a high stress to the internal electrolyte ampoule and thus causes it to shatter. To prevent activation below a specific threshold, an internal shear disc is fitted to the piston that opposes the direction of motion for activation until a minimum ballistic pressure has been overcome. Once above the minimum threshold for activation, the shear disc ruptures and allows the piston to translate into the battery causing the activation. The shear disc feature of the device prevents unintentional battery activation from an accidental drop and if sufficient launch pressure has not been realized by device.

The pressure activated battery system has many advantages over conventional activation mechanisms. First, the system relies on propellant gas to create a piston force to break the glass ampule and therefore no acceleration is required. By incorporating a pressure activated mechanism, the pressure activated battery system is much more reliable than acceleration activated mechanisms because it no longer relies solely on acceleration for rupturing the glass ampoule but now has a direct piston force acting on the cell.

Second, the use of a shear disc allows for defined minimum pressure thresholds to prevent unintentional activation of the battery.

Third, in embodiments of the pressure activated battery system, a feature has been incorporated such that the liquid reserve battery contained internally is floating electrically while inside of the battery activation device. For this embodiment, the positive electrode protrudes central of the housing while the battery case remains as the ground path return. The battery is completely electrically isolated from providing a negative terminal because the ground path is not yet bonded from the piston to the battery case. In this design, there is an air gap between the piston and the rear face of the battery. There is a gap between the two elements, and this prevents electrical contact until the piston travels forward from the ballistic pressure. When the piston translates under launch pressure there are two actions that are occurring, electrical contact between piston and battery housing and the breakage of the glass ampoule. This process is irreversible and as such the battery is activated and is now able to also provide electrical power because the contact path has also been completed in this single action of the piston.

Finally, robust metal sealing of the battery piston to the housing allows operation of the battery in breech pressures over one hundred (100) kilopound per square inch (ksi).

Figure 1:
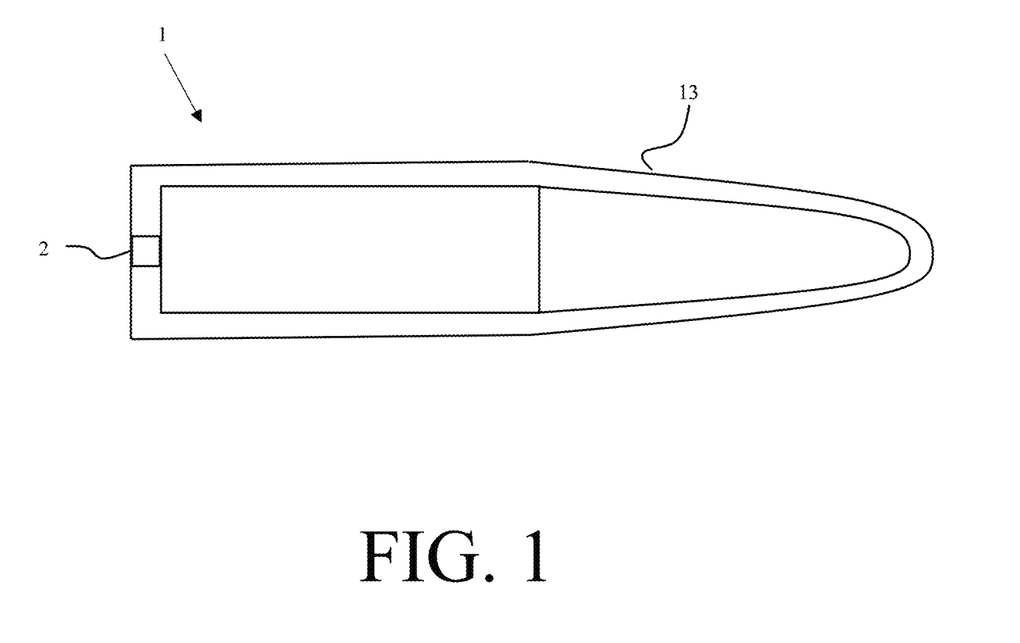
FIG. 1 is a cross-sectional view of a projectile comprising a pressure activated battery assembly, according to an illustrative embodiment.

FIG. 1 is a cross-sectional view of a projectile comprising a pressure activated battery assembly, according to an illustrative embodiment. The projectile 1 shown in FIG. 1 is a gun launched projectile comprising a pressure activated battery assembly 2 in the base of the projectile 1. The projectile 1 further comprises a body 13 defining an interior volume. The interior volume may house various components depending on application including components, such as electronics, which may require electric power from a battery upon projectile launch. The pressure activated battery assembly is housed in the base of the projectile 1 with a rear end in communication with the exterior environment and a forward end in communication with the interior volume of the projectile.

At launch, a propelling charge (not shown) is initiated within the launch tube. Initiation of the propelling charge causes a pressure increase within the launch tube which propels the projectile 1 out of the launch tube and toward the desired target. At a desired time after launch, electric power may be required by the projectile 1.

Once activated, the pressure activated battery assembly provides electric power to the projectile. For example, the electric power may be used to power electronic components of the projectile during flight.

In one embodiment, the pressure activated battery assembly 2 may be employed in an artillery round, such as a rocket assisted artillery munition. In alternative embodiments, the pressure activated battery assembly 2 may be employed in other munitions such as munitions for tank, mortar, artillery, and other gun launched systems. However, the pressure activated battery assembly 2 is not limited to use in munitions but may be employed in any projectile, military or civilian, in which the projectile experiences a pressure increase during operation.

Figure 2:
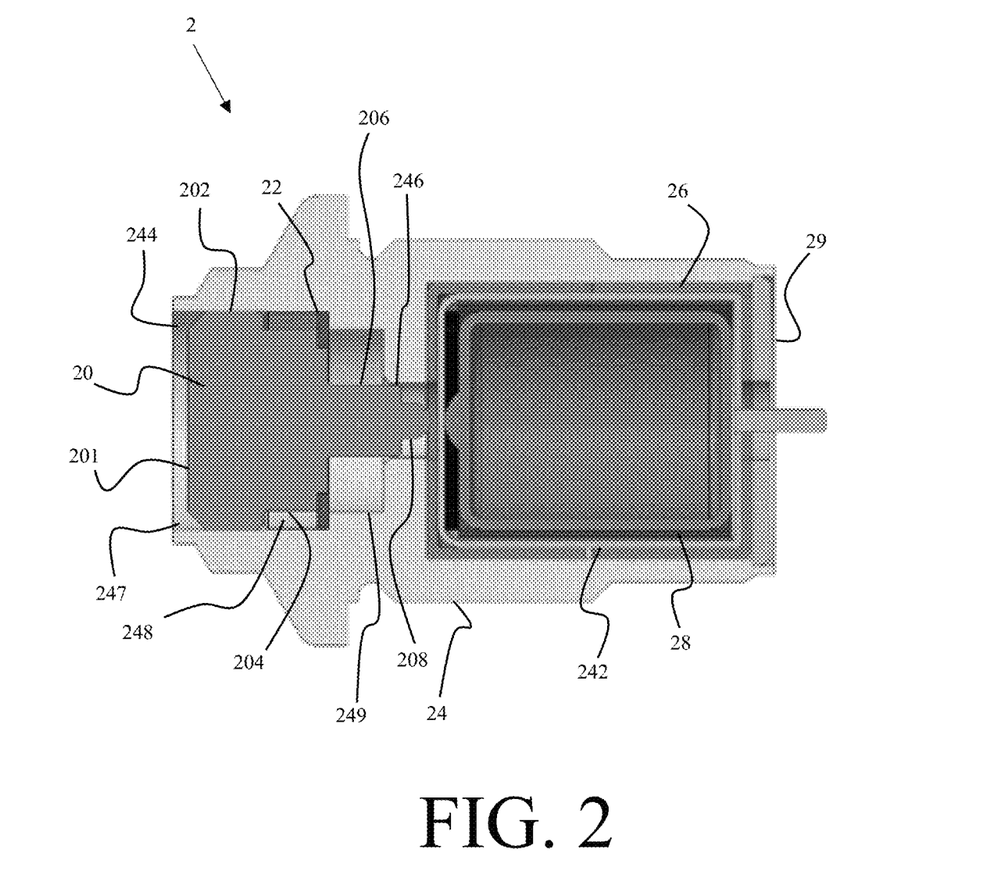
FIG. 2 is a cross-sectional view of a pressure activated battery assembly, according to an illustrative embodiment.
Figure 3:
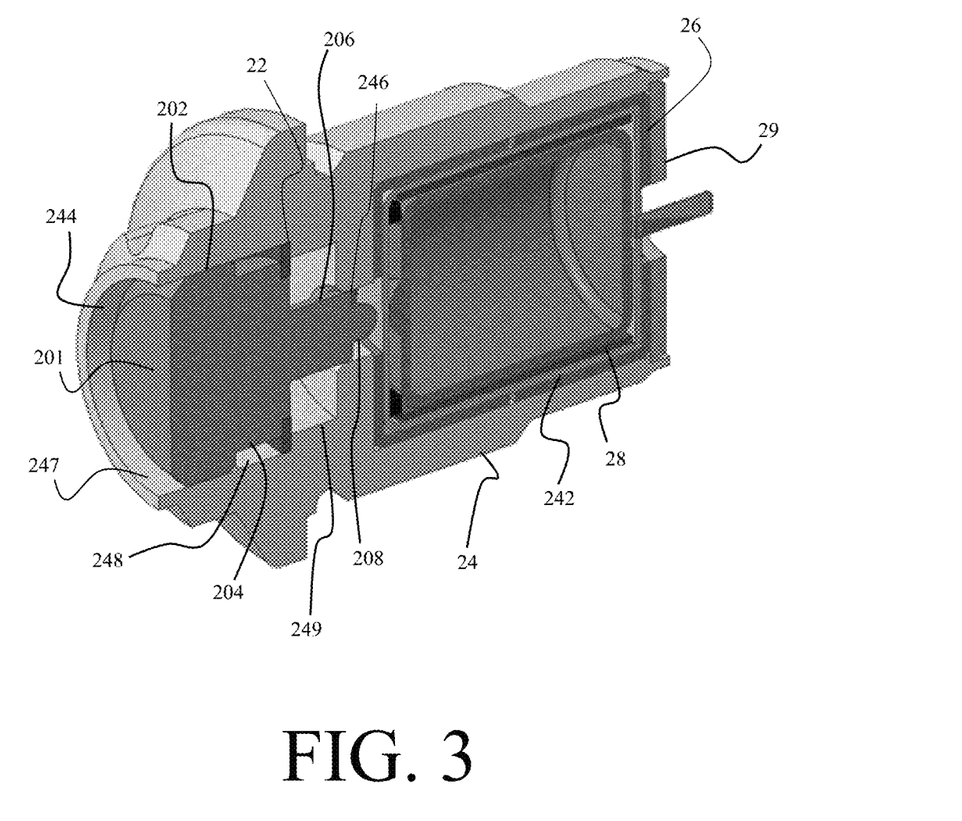
FIG. 3 is a cross-sectional perspective view of a pressure activated battery assembly, according to an illustrative embodiment.
Figure 4:
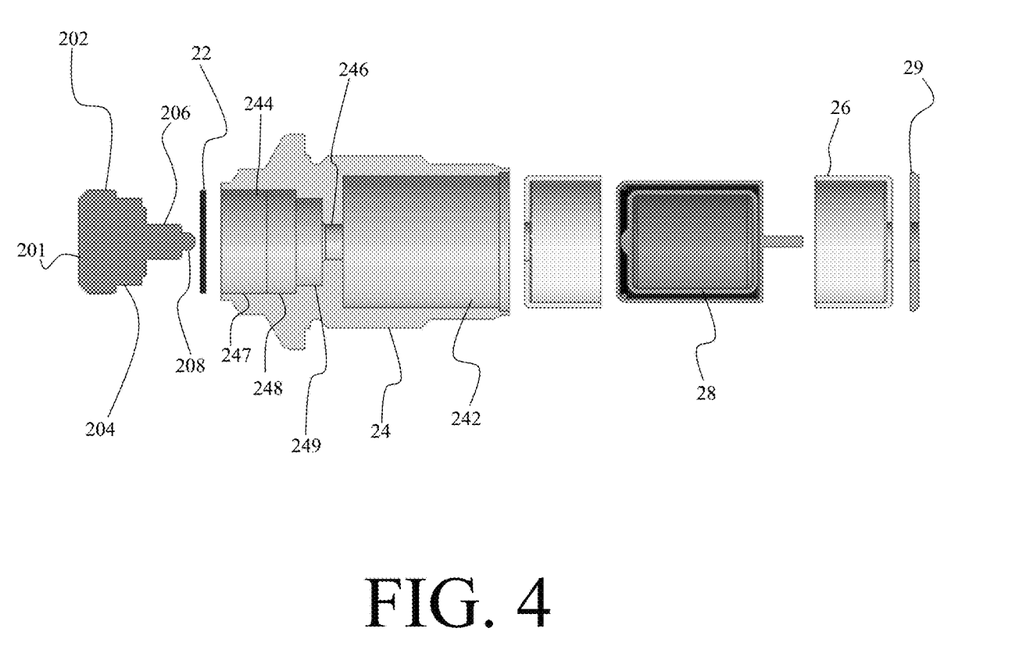
FIG. 4 is a cross-sectional exploded view of a pressure activated battery assembly, according to an illustrative embodiment.

FIG. 2 is a cross-sectional view of a pressure activated battery assembly, according to an illustrative embodiment. FIG. 3 is a cross-sectional perspective view of a pressure activated battery assembly, according to an illustrative embodiment. FIG. 4 is a cross-sectional exploded view of a pressure activated battery assembly, according to an illustrative embodiment. The pressure activated battery assembly 2 further comprises a piston 20, a shear disc 22, a housing 24, an insulator 26, a liquid reserve battery subassembly 28 and a retaining cap 29.

The housing 24 defines a front cavity 242 and a rear cavity 244. The front cavity 242 is in communication with the rear cavity 244 through a hole 246 which connects the front cavity 242 to the rear cavity 244. The front cavity 242 is generally cylindrical and is open to the interior of the projectile 1 through a narrow opening in the retaining cap 29. The rear cavity 244 is in the shape of stepped down cylinder with a rear end open to the exterior of the projectile 1 through a larger opening. The rear cavity further comprises a sliding fit region 247, a press-fit region 248 and a front region 249. The press fit region provides more resistance to the movement of the piston within. For example, the press fit region may have a smaller diameter or have a higher coefficient of friction than the slide fit region.

The rear cavity 244 houses the piston 20 and the shear disc 22. The piston 20 is shaped as a stepped down cylinder with a rear body region 202, a mid-body region 204 and a head region 206 protruding forward from the mid-body region 204. In an embodiment, the crown of the piston 20 further comprises a room temperature vulcanizing (RTV) piston crown.

The exterior profile of the piston 20 corresponds to the interior profile of the rear cavity 244 such that when the piston 20 is positioned forward in the cavity 244, the rear-body region 202 of the piston 20 fits within the press-fit region 248 with the exterior surface of the piston 20 in contact with the interior surface of the press-fit region 248. In this position, the head region 206 fits within the hole 246 between the front cavity 242 and the rear cavity 244. When positioned within this hole 246, a tip 208 of the head region 206 extends into the front cavity 242.

The piston 20 is initially positioned to the rear of the rear cavity 244 in the slip fit region 247. A shear disc 22 is positioned on a rear facing shoulder of the rear cavity 244 and in contact with a face of the piston 20 thereby preventing the piston 20 from entering the front region 249 of the rear cavity 244. The shear disc 22 is dimensioned and has material properties selected to rupture at a desired pressure. For example, the shear disc 22 may be designed to rupture at five (5) kilopounds per square inch (ksi).

The front cavity 242 houses the liquid reserve battery subassembly 28 and an insulator 26 which surrounds the liquid reserve battery subassembly 28. The insulator 26 further comprises an opening aligned with the opening of the hole 246 between the front cavity 242 and the rear cavity 244. A retaining cap 29 with an opening encloses the front of the front cavity 242.

Figure 5:
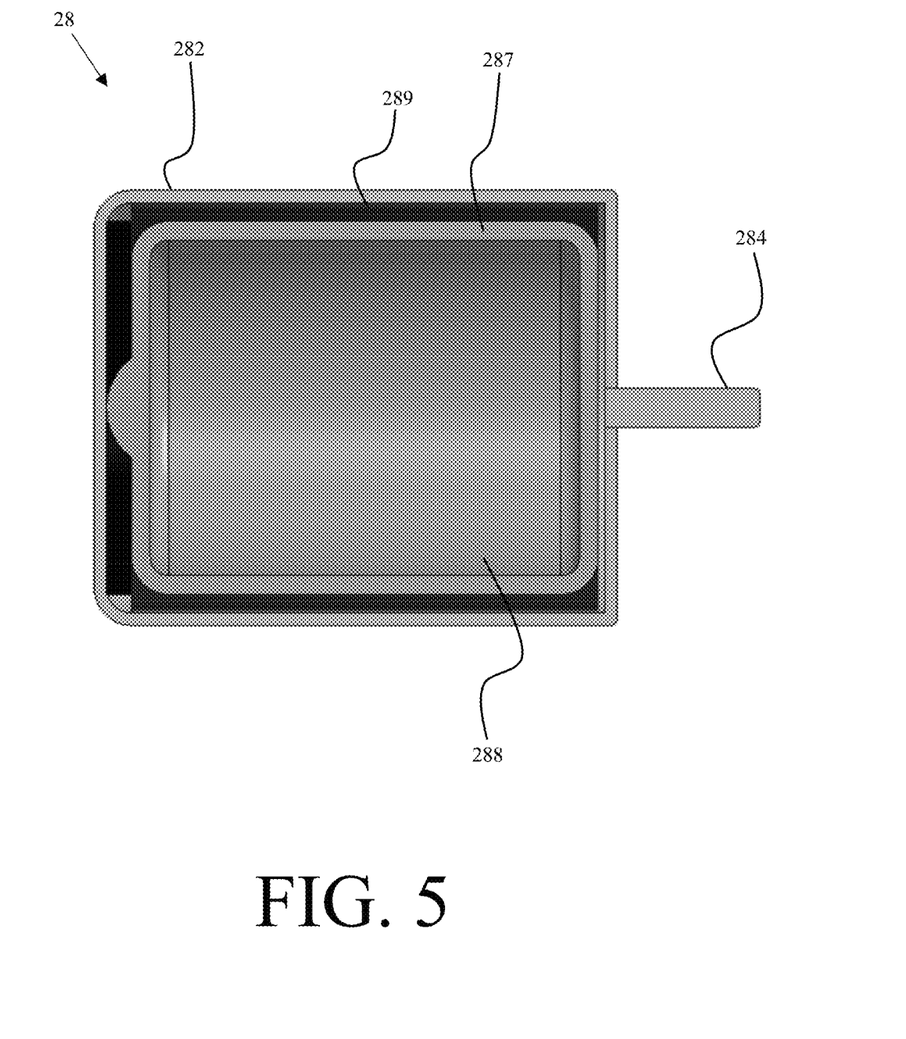
FIG. 5 is a cross-sectional view of a typical glass ampoule type of liquid reserve battery subassembly, according to an illustrative embodiment.

FIG. 5 is a cross-sectional view of a liquid reserve battery subassembly, according to an illustrative embodiment. The liquid reserve battery subassembly 28 further comprises a battery housing 282, which also serves as the negative terminal for the liquid reserve battery subassembly 28. In an embodiment, the battery housing 282 is made of electrically conductive material. A welded seam encloses the subassembly components within the housing. A positive terminal 284 extends from the front of the housing and through the hole in the retaining cap. The liquid reserve battery subassembly 28 further comprises a glass ampoule 287 which when ruptured activates the liquid reserve battery. For example, in an embodiment, the glass ampoule 287 is filled with electrolyte 288, and a spiral wound cell 289. The spiral wound cell surrounds the glass ampoule 287.

Figure 6:
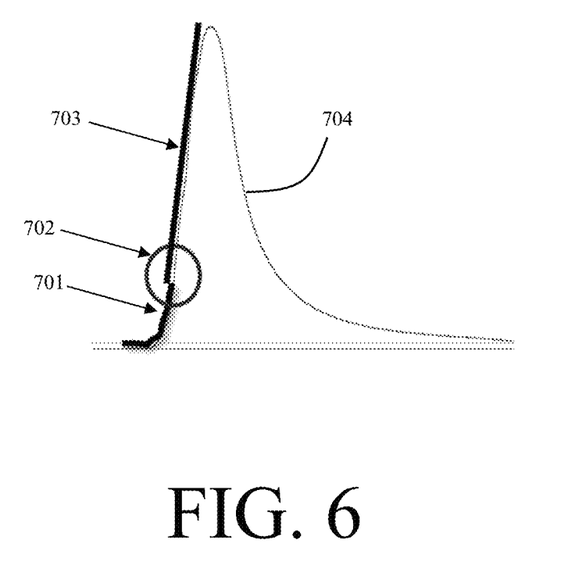
FIG. 6 is a plot showing the stages of the pressure activated battery system in relation to a ballistic pressure time curve, according to an illustrative embodiment.
Figure 7:
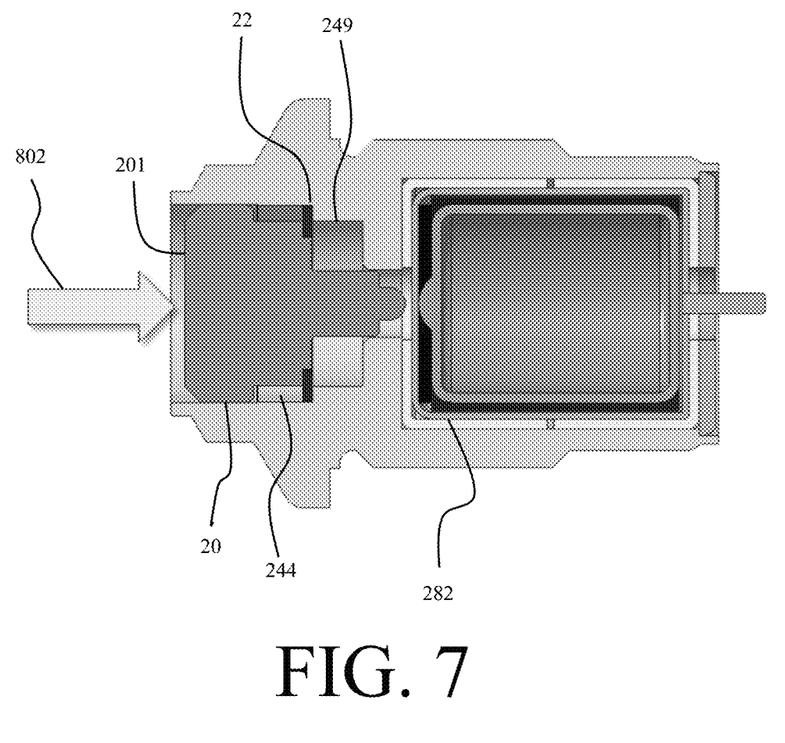
FIG. 7 is a schematic showing the pressure activated battery system in a first stage, according to an illustrative embodiment.

FIG. 6 is a plot showing the stages of the pressure activated battery system in relation to a ballistic pressure time curve, according to an illustrative embodiment. Activation of the pressure activated battery assembly 2 occurs in three stages: a first stage 701, a second stage 702 and a third stage 703. As shown in FIG. 7, each of these stages occurs within the positive sloped portion of the ballistic pressure time curve 704 of the projectile 1. As ballistic pressure builds within the launch tube, the pressure activated battery system 2 activates.

Figure 8:
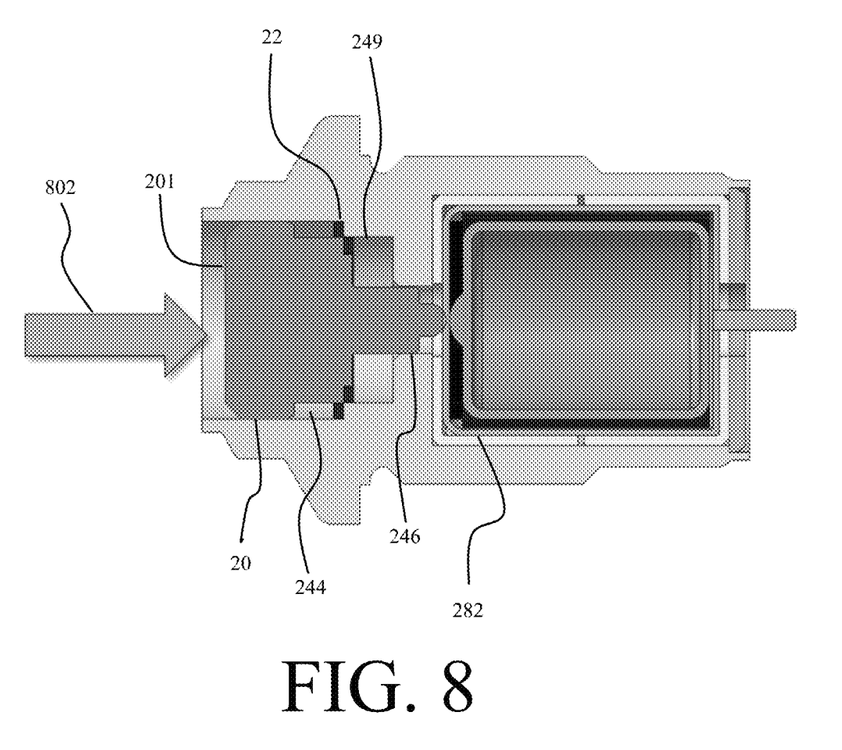
FIG. 8 is a schematic showing the pressure activated battery system in a second stage, according to an illustrative embodiment.

FIG. 7 is a schematic showing the pressure activated battery system in a first stage, according to an illustrative embodiment. In a first stage, or an initialization stage, ballistic pressure is generated within the launch tube by the propelling charge. This ballistic pressure provides a force 802 on the rear face 201 of the piston 20. The shear disc 22 holds the piston 20 back and restrains the rear end 202 of the piston 20 from translating into the press-fit region 249 of the rear cavity 244. At this stage, the liquid reserve battery subassembly 28 is electrically floating in the housing. There is no voltage generation by the liquid reserve battery subassembly 28. As shown in FIG. 8, at this stage, the shear disc 22 is intact and there is an air gap between the piston 20 and battery housing 282 and therefore no electrical contact.

Figure 9:
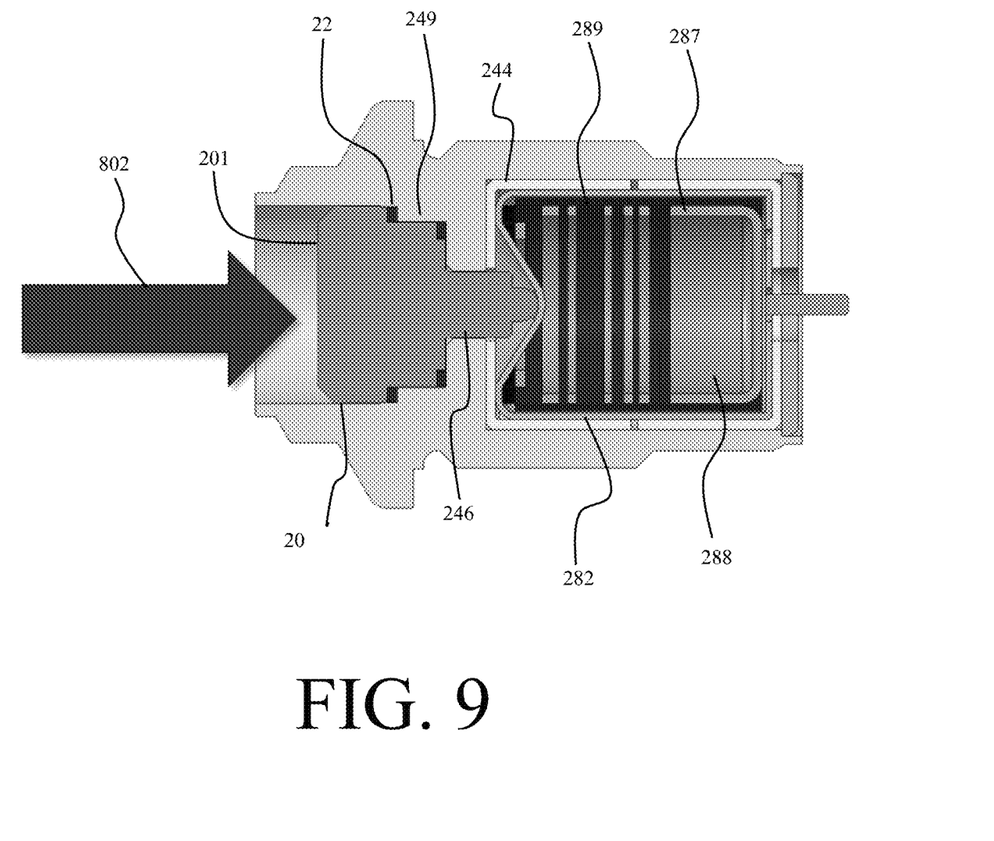
FIG. 9 is a schematic showing the pressure activated battery system in a third stage, according to an illustrative embodiment.

FIG. 8 is a schematic showing the pressure activated battery system in a second stage, according to an illustrative embodiment. In a second stage, or transitional stage, the ballistic pressure continues to build within the launch tube and therefore the force on the rear face 201 of the piston 20 increases. The shear disc 22 ruptures at a desired pressure. For example, the shear disc 22 may be designed to rupture at 5 ksi. The piston 20 translates into the press fit region 248 of the housing and the head region translates through the hole 246. There is initial contact between a tip of the head region of the piston 20 with the battery housing 282 to close the ground path. There is no voltage generation. As shown in FIG. 9, the shear disc 22 is ruptured and contact is made between piston 20 to battery case.

FIG. 9 is a schematic showing the pressure activated battery system in a third stage, according to an illustrative embodiment. In a third stage, or full actuation stage, the battery is fully activated. The ballistic pressure continues to rise to its maximum. For example, during this stage, the ballistic pressure may rise from 5-100 ksi. The battery comprises three pressure seals: the room temperature vulcanizing (RTV) material on the piston crown, the heavy press fit of piston 20 surface to the press-fit region 248 surface and the two areas where a metal to metal gasket is formed from the shear disc remnant that is trapped between the bottom of the piston crown and the ledge on the housing. The piston 20 is fully seated in its final position within the rear cavity 244 and the shear disc 22 remnant forms the gaskets described above. The head of the piston 20 extends into the rear cavity 244 and the tip contacts and deforms the battery housing 282. The glass ampoule 287 shatters and disperses electrolyte 288 within the battery housing 282. Voltage is generated and the switch is closed. As shown in FIG. 9, the shear disc 22 remnant forms a seal, and the switch is closed.

While the invention has been described with reference to certain embodiments, numerous changes, alterations, and modifications to the described embodiments are possible without departing from the spirit and scope of the invention as defined in the appended claims, and equivalents thereof.

What is claimed is:

1. A pressure activated battery system for a projectile wherein ballistic pressure for launching the projectile transitions the pressure activated battery system from an inactive state to an active state by translating a piston to activate a reserve battery, said pressure activated battery system further comprising:
    a housing further defining a front cavity and a rear cavity connected by a central hole, said rear cavity comprising a slip fit region exposed to an external environment and a press fit region forward of the slip fit region;
    a piston contained within the rear cavity and which the inactive state is restrained within the slip fit region by a shear disc positioned between the slip fit region and the press fit region;
    a liquid reserve battery subassembly housed within the front cavity, said liquid reserve battery subassembly further comprising a battery housing and an electrolyte-filled glass ampoule contained within said battery housing;
    and wherein in response to ballistic pressure, the piston translates forward in the rear cavity thereby rupturing the shear disc and breaking the electrolyte-filled glass ampoule to transition the pressure activated battery system to the activated state.

2. The pressure activated battery system of claim 1 wherein the translation of the piston simultaneously completes a battery ground circuit of the liquid reserve battery subassembly.

3. The pressure activated battery system of claim 1 wherein the battery housing further houses a liquid reserve battery cell and the battery housing and serves as a negative terminal of the liquid reserve battery subassembly and wherein in the inactive state, the liquid reserve battery cell is not in contact with the battery housing and in the activated state, the liquid reserve battery cell is in contact with the battery housing thereby completing a circuit.

4. The pressure activated battery system of claim 3 wherein the completed circuit is a ground circuit.

5. The pressure activated battery system of claim 3 wherein the piston comprises a mid-body region corresponding in shape to the press-fit region of the rear cavity and a head region sized and dimensioned to be inserted into and protrude through the hole connecting the front cavity and rear cavity and into the front cavity thereby deforming the battery housing to simultaneously complete a battery ground circuit and break the electrolyte-filled ampoule.

6. The pressure activated battery system of claim 5 wherein the ruptured shear disc forms a seal between an exterior surface of the piston an interior of the rear cavity.

7. The pressure activated battery system of claim 3 further comprising a positive battery terminal extending forward from the battery housing and through an opening in the housing.

8. The pressure activated battery system of claim 1 wherein the shear disc ruptures at a predetermined ballistic pressure.

9. A gun-launched projectile comprising a pressure activated battery system in a base of the projectile, the pressure activated battery system further comprising:
  a housing further defining a front cavity and a rear cavity connected by a central hole, said rear cavity comprising a slip fit region exposed to an external environment and a press fit region forward of the slip fit region;
  a piston contained within the rear cavity and which the inactive state is restrained within the slip fit region by a shear disc positioned between the slip fit region and the press fit region;
  a liquid reserve battery subassembly housed within the front cavity, said liquid reserve battery subassembly further comprising a battery housing and an electrolyte-filled glass ampoule contained within said battery housing;
  and wherein in response to ballistic pressure, the piston translates forward in the rear cavity thereby rupturing the shear disc and breaking the electrolyte-filled glass ampoule to transition the pressure activated battery system from an inactive state to an activated state by simultaneously releasing an electrolyte in the liquid reserve battery subassembly and completing a battery ground circuit of said liquid reserve battery subassembly.

10. The projectile of claim 9 wherein the battery housing further houses a liquid reserve battery cell and serves as a negative terminal of the liquid reserve battery subassembly and the piston comprises a mid-body region corresponding in shape to the press-fit region of the rear cavity and a head region sized and dimensioned to be inserted into and protrude through the hole connecting the front cavity and rear cavity and into the front cavity thereby deforming the battery housing to simultaneously cause contact between the liquid reserve battery cell and the battery housing to complete a battery ground circuit and break the electrolyte-filled ampoule.

11. The projectile of claim 10 further comprising a positive battery terminal extending forward from the battery housing and through an opening in the housing.

12. The projectile of claim 9 wherein the shear disc ruptures at a predetermined ballistic pressure.

13. The projectile of claim 9 wherein the ruptured shear disc forms a seal between an exterior surface of the piston an interior of the rear cavity.

14. The projectile of claim 9 further comprising an interface component for securing the battery activation device in the projectile.

15. The projectile of claim 9 wherein the interface component is inserted into a base of an artillery munition.

* * * * *